6761X
M. Bull,
Making Shovels,
Patented Sep. 28, 1831.
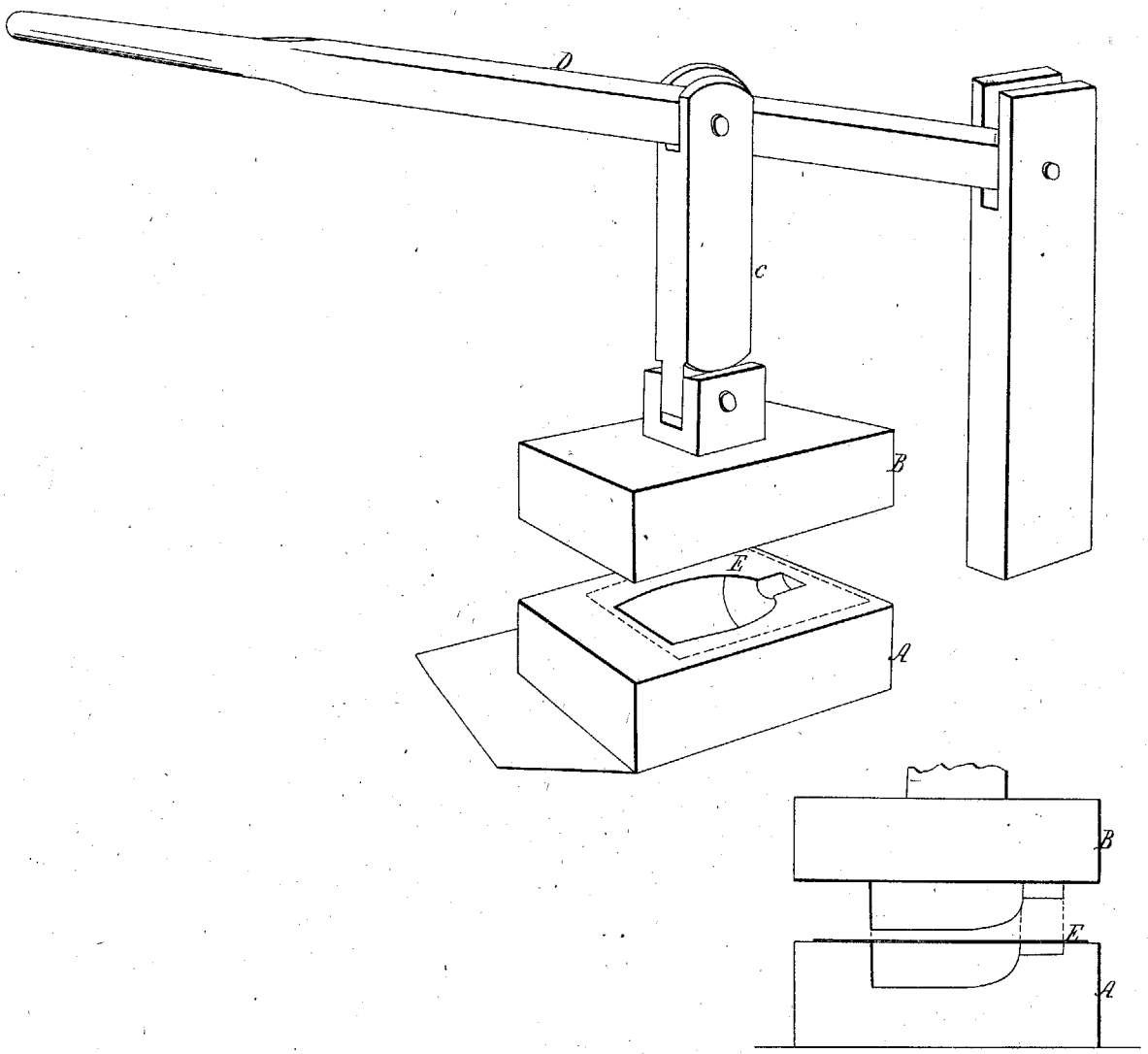
N. PETERS, PHOTO-LITHOGRAPHER, WASHINGTON, D. C.

[illegible] 15

Sept. 28. 1831 [illegible]

D Mordicai Bull Greenwich N.Y. 6761X

Letters Patent

The Schedule referred to in these Letters Patent and making part of the same containing a description in the words of the said Mordicai Bull himself of his improvement in manufacturing Shovels or Scoops from Sheet iron copper tin &c.

Be it known that I Mordicai Bull of the town of Greenwich in the County of Washington and State of New York have invented a new and useful improvement in manufacturing Scoops or Shovels from sheet iron copper tin or any other metal and that the following is a full and exact description of the construction and operation of the said machine as invented or improved by me.

I have a cast iron mould in shape of the Shovel to be manufactured upon this I place my Sheet of iron copper tin or any other metal. I then have a follower made so nearly to fill the mould as to leave only space for the iron copper tin or any other metal: upon the top of the follower at or near the centre is a block of iron nearly square attached to the follower and cast with it with a mortise in the top into which is fastened a bar of iron perpendicular about two inches; to this I attach a beam which I secure at one end against any thing that will hold it and thereby means of a power attached to the lever the follower presses the iron, copper, tin or any other metal into the mould which when trimmed forms the blade of the Scoop or Shovel: this is attached to a handle by means of a plate of iron secured underneath the Scoop or Shovel and a [illegible] secured round the edge.

I make use of a press and [illegible] or any other power or manner of forcing the iron copper, tin or any other metal into the mould Witnesses
Joseph Holmes
Stephen [illegible]

Mordicai Bull.

[illegible]

[illegible]